Sept. 28, 1965 A. V. FARINA 3,209,085

COMBINED TELEPHONE HOOK, PAD AND PENCIL HOLDER

Filed May 26, 1960 2 Sheets-Sheet 1

INVENTOR.
Anthony Victor Farina

BY William J. Ruano his ATTORNEY

Sept. 28, 1965 A. V. FARINA 3,209,085

COMBINED TELEPHONE HOOK, PAD AND PENCIL HOLDER

Filed May 26, 1960 2 Sheets-Sheet 2

INVENTOR.
Anthony Victor Farina
BY
William J Ruano
his ATTORNEY 3,209,085

COMBINED TELEPHONE HOOK, PAD AND PENCIL HOLDER

Anthony Victor Farina, 227 Michigan St., New Kensington, Pa.

Filed May 26, 1960, Ser. No. 31,948
7 Claims. (Cl. 179—146)

This invention relates to an attachment for a wall phone, which attachment serves as a combined telephone hook, pad and pencil holder.

An outstanding disadvantage in the use of wall type telephones is that when the person answering has to page the called party who is not within calling distance, the answering party must either leave the receiver dangling from its cord or attempt to suspend the receiver on top of the box, which is highly unstable since the receiver and box are very smooth, therefore, the receiver ofttimes slips off this position, tending to become damaged or marring the wall, also when small children are in the home they are likely to pull the cord and become seriously injured by the falling receiver.

A still further disadvantage in the use of wall phones or table-type phones is that there is no convenient place nearby for holding a pencil and pad for making notes during a telephone conversation.

An object of my invention is to provide a novel attachment for mounting on a telephone which will overcome all the above named disadvantages and which requires no holes or screws for attachment to the phone or to a wall, therefore will not mar the telephone or wall, and which may be easily and quickly mounted by merely slipping it on top of the telephone.

A more specific object of my invention is to provide a unitary attachment for a wall-type telephone, which attachment includes an auxiliary telephone hook, pad and pencil holder so as to provide considerable convenience in the use of the wall telephone, and which will appear as a component part of the wall telephone.

A further object of the invention is to provide a novel attachment including a pad and pencil holder which may be mounted on a table-type of telephone.

Other objects and advantages will become more apparent from a study of the following description taken with the accompanying drawing wherein.

Figure 4:
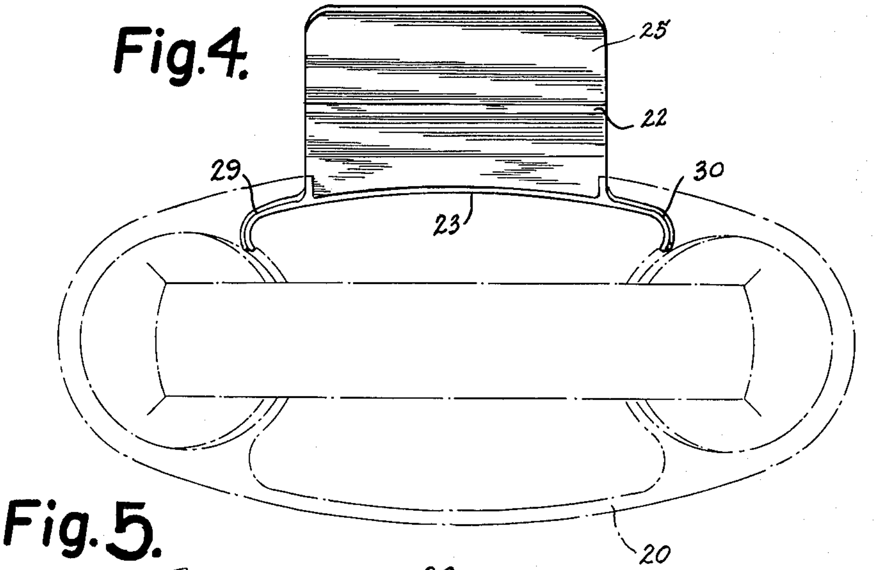
Figures 5, 6, 7:
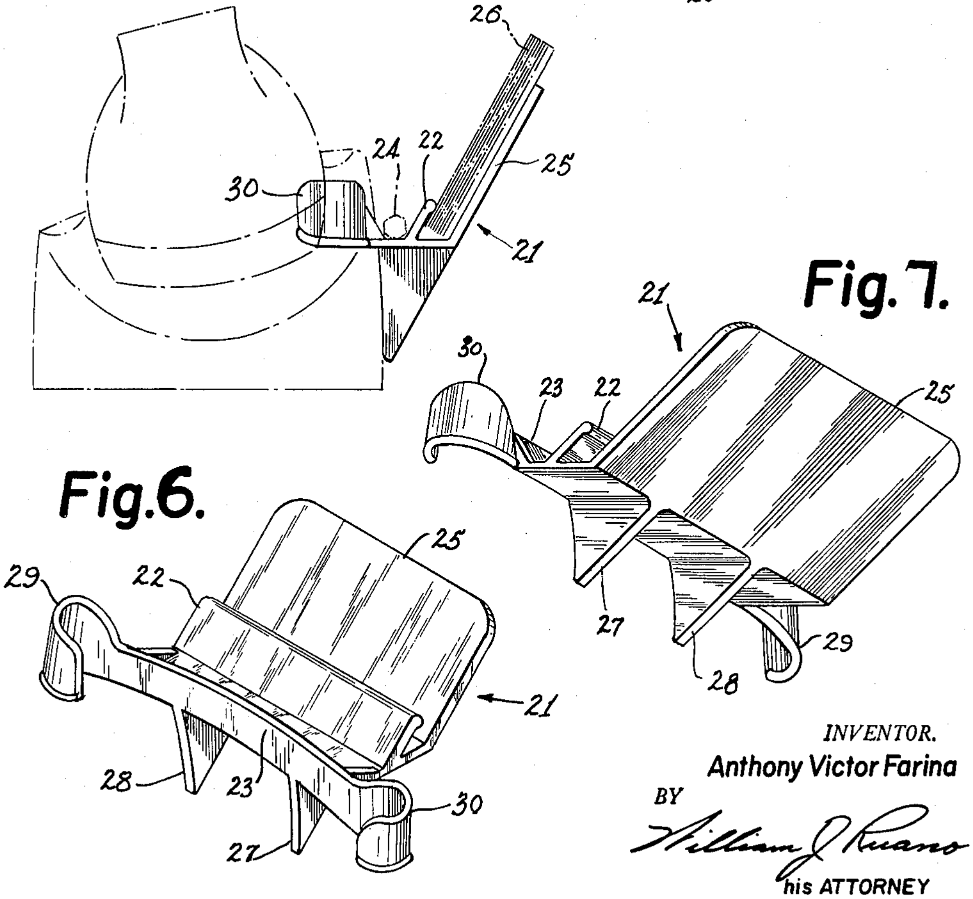

FIGS. 4 and 5 are top and side views, respectively, of a modified form of attachment useful for a table-type telephone shown in dot and dash outline and adapted to support a pad and pencil also shown in dot-and-dash outline; and FIGS. 6 and 7 are top front and lower rear perspective views of the attachment shown in FIGS. 4 and 5.

Figure 1:
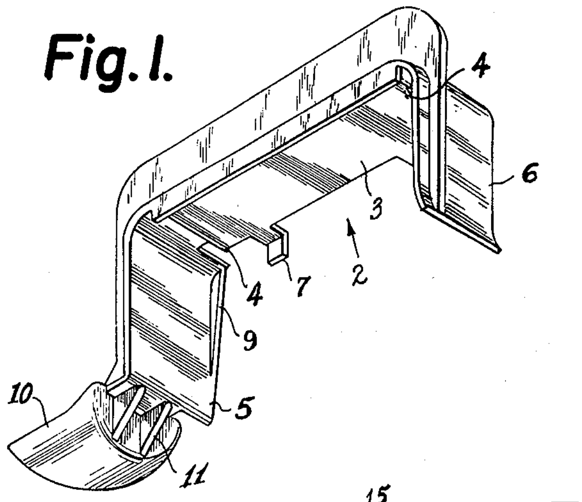
FIGS. 1 and 2 are bottom and top perspective views, respectively, taken from opposite sides of an attachment for a wall-type telephone.
Figures 2, 3:
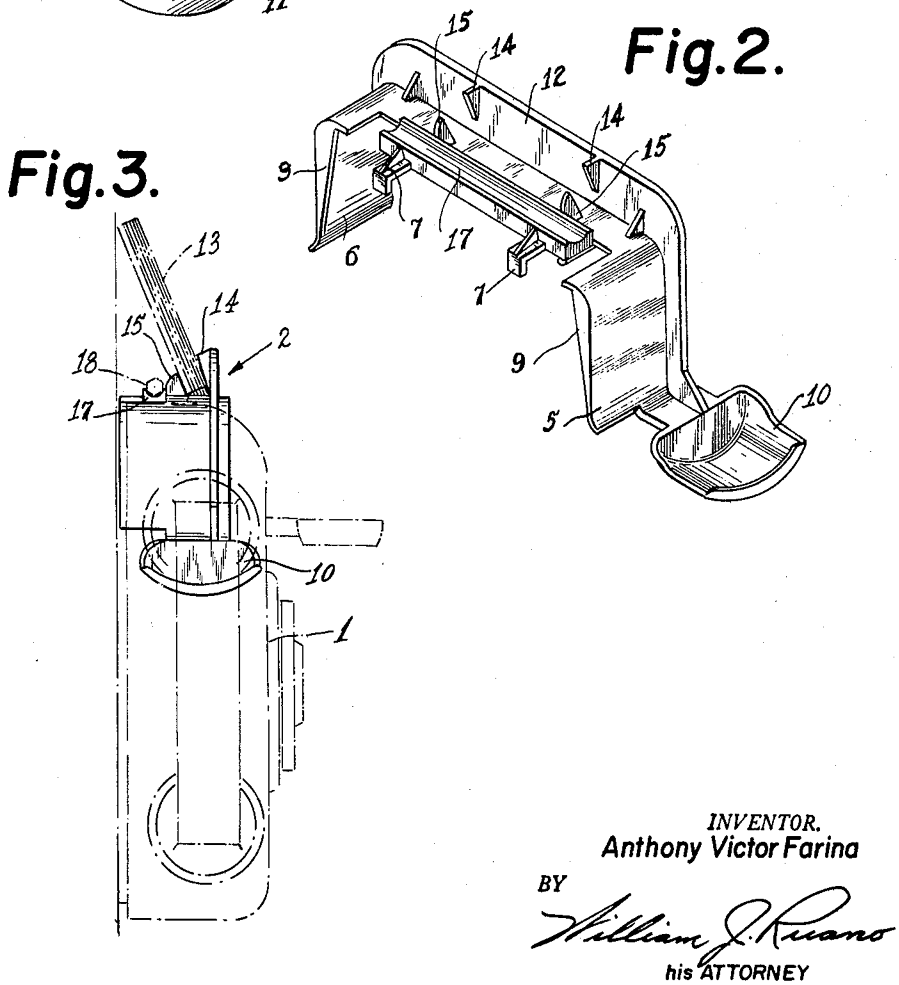
FIG. 3 is a side view of the attachment shown in FIGS. 1 and 2 illustrated as being mounted on a wall-type telephone shown in dot-and-dash outline.

Referring more particularly to FIGS. 1, 2 and 3 of the drawing, numeral 1 denotes a conventional wall-type telephone, illustrated in dot-and-dash outline since it per se forms no part of the present invention, and numeral 2 generally denotes a telephone attachment embodying the present invention and preferably made of plastic, one piece construction, although it may be made of metal or other materials and of more than one piece, if so desired. The attachment is of substantially inverted U-shaped construction, including a top or intermediate portion 3 which is adapted to lay on the top of the box-like wall phone 1 and including a pair of beads 4 projecting downwardly from the lower surface which fit into grooves formed on top of a conventional wall-type phone, and having integral, downwardly and angularly inwardly extending side portions 5 and 6 whose ends are spaced apart by a distance less than the width of the phone so as to provide spring action to firmly clamp against the side portions of the wall telephone. Integral hooks, such as 7, are provided on the top portion 3 and preferably, flanges 9 are integrally formed on the side portions 5 and 6, also serving to firmly grasp the rear surface of the wall phone to assure that the attachment will not slip off. Flanges 9 also add firmness or springiness to the side portions 5 and 6.

On the bottom of side portion 5 there is integrally formed a hook 10 for temporarily holding the receiver when paging the called party. Integral flanges 11 provide a rigid support for the receiver hook 10.

Integrally upstanding from the top portion 3 is a flange 12 providing rigidity throughout substantially the entire clamp portion which serves as a front stop for a pad 13, shown in dot-and-dash outline. Integral webs or ribs 14 are formed on the rear of flange 12 and opposing webs 15 are formed on the top portion 3 which provide angularly disposed opposing parallel stop surfaces for gripping the pad and directing it upwardly and angularly rearwardly so that the top end of the pad will lean against the rear wall, as shown more clearly in FIG. 3. In some cases ribs 14 and 15 may be omitted.

Integral with the top portion 3 is a pencil holder 17 in the form of a well, also made of plastic material.

The attachment is mounted on the wall-type telephone 1, merely by slipping it on top thereof, making sure that the hooks 8 and flanges 9 hook onto the back surface of the wall phone. Thus the attachment is held by the spring action of the normally angularly inwardly extending side portions 5 and 6 as well as by the hooks 7 and flanges 9 to assure a very firm hold. A pad 13 and a pencil 18 may be laid in place on top of the attachment, in the manner shown in FIG. 3.

In operation, when the person answering the phone removes the receiver from the conventional phone hook and wishes to page the called party, who may be out in the yard or at some distance from the phone, the answering party will temporarily support the receiver on the hook 10 so as to hold the line while he goes out to page the called party. Of course, messages may be readily taken by the use of pad 13 and pencil 18.

FIGS. 4 to 7 inclusive show a modification of the invention which is in the form of an attachment which is adapted to slip on top of a table-type telephone, such as one sold under the trademark "Princess" by the Bell Telephone Company, which phone, per se, forms no part of the present invention. Since the receiver for this type of telephone may be laid on top of the table, an auxiliary hook is not needed. Therefore, the attachment 21 includes only a well portion between flanges 22 and 23 for receiving a pencil 24. The pad holder comprises an integral, angularly rearwardly extending back portion 25 and a parallel flange 22 which support the rear and front portions of the pad 26. Flanges 27 and 28 provide rigidity for the back portion 25 as well as serving as stop elements for engagement with the rear wall portion of the phone casing. Winged end portions 29 and 30 are provided which are curved about the correspondingly shaped rear top projecting portion of the phone, as shown more clearly in FIGS. 4 and 5. Thus the attachment may be held without the necessity of screws, clips or the like which might mar the telephone, and yet by virtue of the specific shape of the attachment, a very firm mounting is provided to enable writing on the pad and application of considerable pressure against the backing 25.

Both forms of attachments, described above, are preferably made of plastic material, such as polyethylene, styrene or of the same material as the conventional telephone box and having the same color as the phone on which it is attached, such as black, white, grey, ivory, green etc. and thus will appear as a component part of the telephone.

Thus it will be seen that I have provided an efficient, unitary attachment for a telephone including an attachment which provides an auxiliary hook for the receiver and which provides a pad and pencil holder, thus furnishing a high degree of convenience to the answering party, either while paging the called party or while taking notes of a telephone conversation; furthermore I have provided a relatively inexpensive, one piece plastic attachment or clamp, preferably of the same color of the telephone and which is very securely attached and mounted on the telephone by merely slipping it on top of the phone without the necessity of forming holes or otherwise marring either the phone or the adjacent wall on which the phone is mounted.

While I have illustrated and described several embodiments of my invention, it will be understood that these are by way of illustration only, and that various changes and modifications may be made within the contemplation of my invention and within the scope of the following claims.

I claim:

1. An attachment for mounting on top of a telephone casing, said attachment including an integral upstanding, flat panel portion having ribs against which a pad is adapted to rest and a well portion for supporting a pencil, and including integral side portions for snugly engaging the side portions of the telephone casing.

2. An attachment as recited in claim 1 together with downwardly projecting stop elements extending from an intermediate portion of said attachment for engaging the rear surface of said telephone casing.

3. An attachment for a wall-type telephone, said attachment comprising an intermediate portion for support on top of the casing of said phone and having depending side portions for firmly grasping the side portions of the phone, and a hook integrally secured to one of said side portions for temporarily supporting a telephone receiver when paging a called party.

4. An attachment as recited in claim 3 together with integral hook portions formed on the rear of said intermediate portion for hooking to the rear surface of the wall telephone casing.

5. An attachment as recited in claim 4 together with flanges integrally formed on the rear portions of said side portions for attachment to the rear surface of the wall telephone casing.

6. An attachment as recited in claim 3 together with an upstanding vertical flange integrally formed on said intermediate and side portions and being continuous throughout substantially the entire inverted U-shape contour of said attachment.

7. An attachment as recited in claim 3 together with an integral pencil holder formed on the rear portion of said intermediate portion.

References Cited by the Examiner

UNITED STATES PATENTS

| | | | |
|---|---|---|---|
| D. 160,224 | 9/50 | Smyth | 179—178 |
| 1,983,443 | 12/33 | Douceska et al. | 179—178 |
| 2,693,509 | 11/54 | Selee | 179—146 |
| 2,843,684 | 7/58 | Guardino | 179—178 |
| 2,929,886 | 3/60 | Marback | 179—146 |
| 2,973,411 | 2/61 | Ingrao | 179—146 |

ROBERT H. ROSE, *Primary Examiner.*

L. MILLER ANDRUS, WILLIAM C. COOPER, *Examiners.*